Aug. 28, 1934.   C. B. HUNTMAN   1,971,961
SIMPLIFIED STABILIZER AND SHOCK ABSORBER FOR AUTOMOBILES
Filed May 15, 1934
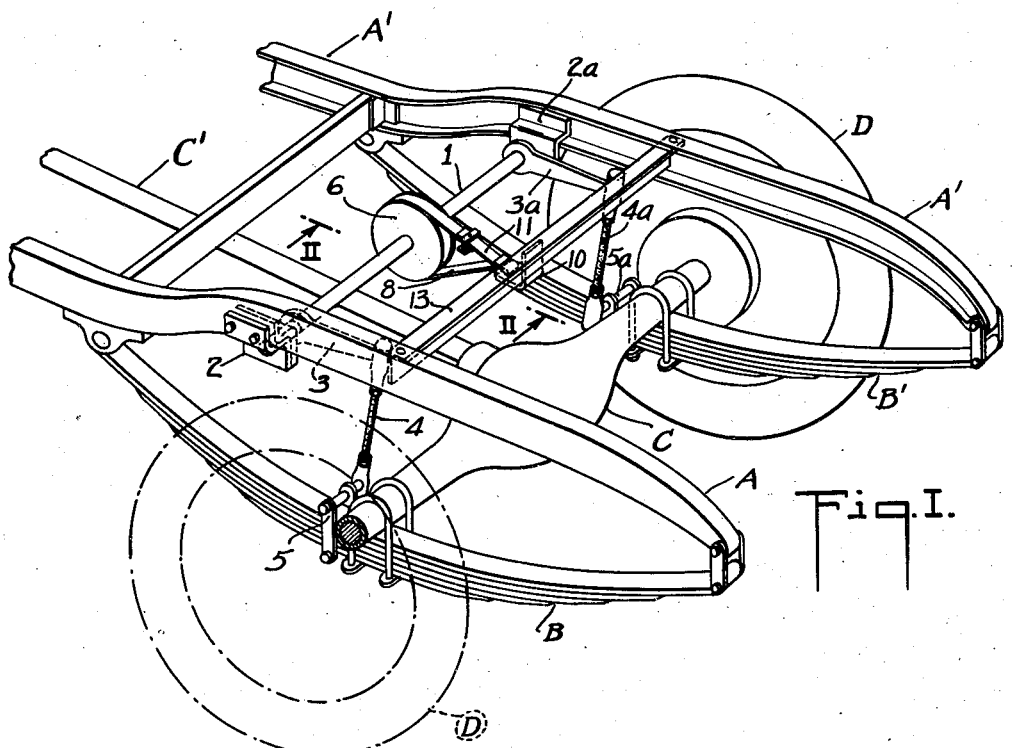
Fig. I.
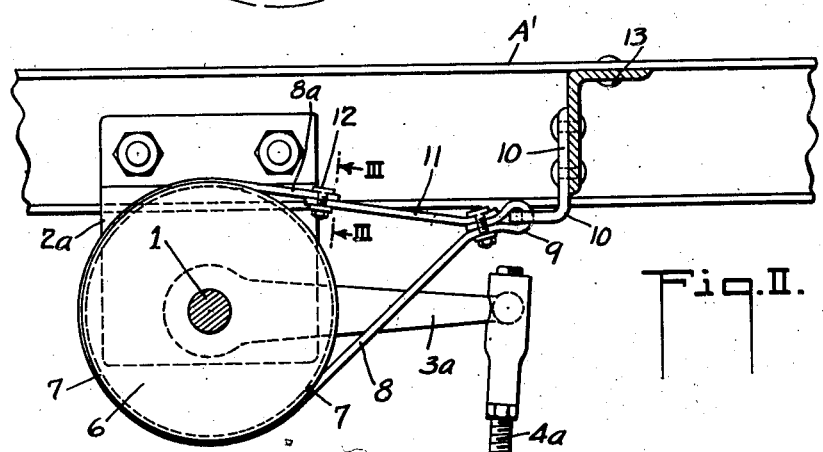
Fig. II.
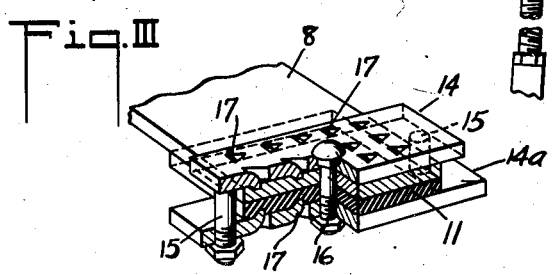
Fig. III.
INVENTOR
Charles B. Huntman
BY
ATTORNEY Patented Aug. 28, 1934

1,971,961

UNITED STATES PATENT OFFICE 1,971,961

SIMPLIFIED STABILIZER AND SHOCK-ABSORBER FOR AUTOMOBILES

Charles B. Huntman, Plainfield, N. J., assignor to Huntman Stabilizer Corporation Application May 15, 1934, Serial No. 725,677

5 Claims. (Cl. 267—11)

This invention relates to the equalizing or balancing of shocks such as are involved in motor cars when the wheels on one side are displaced by the uneven contour of the road, or when centrifugal strain tends to careen the body when a car at speed is deflecting its course. It involves the absorbing of such shocks or strains, balancing the effect of the strains on both sides of the car, dampening the reaction of any wheel or body displacement due to such shocks or unequal force on opposite sides of the car, and various other advantages which will appear from the more detailed description hereinafter set forth and be pointed out in the claims.

In general, it relates to mechanism or apparatus, or car equipment which aims to prevent sidesway of the body or of the entire sprung mass when rounding curves at speed, and to prevent or minimize side-rocking or listing or rolling of the car due to uneven road surface, particularly when wheel or wheels on one side engage obstacles or ruts different in magnitude from those engaged by the wheel or wheels on the opposite side.

This particular application involves apparatus and structure to accomplish such advantageous results in a construction simplified as compared with my prior constructions of combined stabilizing and shock-absorbing equipment or means, compared with constructions shown and described in prior patent applications filed by me, the invention herein set forth being more particularly addressed to the combination of a cross-car, sidesway, careening or side-rocking means cooperating with a single shock-absorbing or damping means.

This application involves a form of development I have made and tested relating to the inventions set forth in my copending application filed August 24, 1925, Ser. No. 51,908, as well as a development or simplification of the construction shown in my copending application filed May 8, 1934, Ser. No. 724,532, and involves further improvements and modifications aiming, among other purposes, to simplify the construction of combined shock-absorbing and anti-sidesway or side-rocking equipment for automobiles.

My invention herein claimed aims to provide a torque-bar for cross car stabilizing, having suitable connections on both sides between the sprung and unsprung mass to provide for cross-bar balancing of force or shock tending to affect one side more than the other side, and having a single damping or shock-absorbing device effective through the cross-car stabilizing means such as the torque-bar, which single shock-absorbing element affects in common at any and all times the recoil on each and on both sides of the car after the side springs of the car on either side have been subject to deflection.

In the form herein specifically shown and described, I combine a cross car-torque-bar having bearings on the opposite side sills of the car frame, with a suitable arm near each end forming a lever oscillating with the torque-bar and having at its free end suitable linkage carrying any displacing force or movement of the unsprung mass with respect to the sprung mass in order to oscillate the lever arms—and thereby the torque-bar. With this I combine a brake-drum on the torque-bar and a brake-band attached to a fixed part of the car frame forming a dampening means to retard the rotation of the drum, and therefore the torque-bar, more in one direction of oscillation than the other. This brake or snubbing band acts on the drum attached to the bar so that, in particular, when the bar has been turned due to shock or the strains of centrifugal force, when the car is driven around a curve, will permit relatively free turning of the bar and drum in one direction, but dampen and retard the return oscillation of the bar. The effect of this single shock-absorbing device is carried by the bar through both arms near the sides and through the links, so that the single element is effective on both sides and, furthermore, the recoil dampening means is equally effective on both sides, and likewise shock from either or both sides is equally effective on the shock absorber device.

Fig. I is a perspective view from the side and rear of the rear end of a chassis, containing my invention.

Fig. II is a side view on the section line II—II of Fig. I, on an enlarged scale.

Fig. III is a perspective view of one of the joints in the shock absorber band, substantially on the section III—III of Fig. II, on a larger scale.

The chassis has the frame side sills A, A', springs B, B' forming the spring suspension between the sills and a wheel-borne member on either side of the car. The axle housing C is interconnected in the usual manner with the wheels D, D', so that the housing ends each have a wheel-borne part rigidly clipped on a suitable saddle or seat with U bolts, or in any usual manner, to the approximate middle of the springs B, B', so that the spring adjacent the axle housing end is rigidly associated and therefore moves with the housing end, and for the purposes hereof functions as a part of the wheel-borne member. A drive shaft or drive shaft housing C' extends from the rear axle housing in the usual manner to the power transmission connections with the engine.

On the sills A, A' I clamp plates forming a support and bearing for the cross-car torque-bar 1. These bearings 2, 2ª are herein shown as used by me in this construction comprising two suitably shaped plates nesting on the outside and inside of the lower flanges of the sill channels, and extending sufficiently below them to clear the sills and together so as to form below the sills suitable bearings permitting the opposite ends of the torque-bar 1 to oscillate and be suitably supported.

Rigidly secured near each end of the torque-bar 1 are mounted the lever arms 3, 3ª, being shrunk or splined onto the ends, or in any desired manner secured so that the lever arms oscillate with the torque-bar 1. The movable ends of these arms are connected by the links 4, 4ª, to transmit force and motion, each from a wheel-borne part responsive to the motion or the force on the respective wheels D, D', and in the form shown these links are connected each to a clip 5, 5ª, clamped to the spring immediately adjacent the axle housing ends, so that the motion and force originating from displacement of each wheel on either side of the car as well as force reacting on each wheel, is operatively transmitted to the links. As shown, the links have a ball joint at each end which accommodate articulation in the direction necessary to accommodate the reciprocating motion at the connections with the wheel-borne member as well as the connection with the ends of the lever arms 3, 3ª.

On the torque-bar 1 I secure a drum 6 forming a shock absorber part, which in the form illustrated comprises a pulley with a cylindrical exterior flanged as by shrouds 7 to confine a belt or brake-band 8 encircling the drum substantially more than half its circumference. The drum 6 may be secured to the torque-bar 1 in any desired manner, as by a hub shrunk or locked onto the bar with means to clamp the drum to turn with the bar, or by a key or any other suitable manner, but the assembly of the torque-bar so equipped provides for practical mounting of the pulley and the lever arms at either end, or the mounting of the drum-bushing adapted to receive a split-drum construction, suitable for the transmission power or the functioning thereof as hereinafter described.

The band 8 encircling the drum may be such as used on the brake-bands, in order to cling and provide frictional resistance between the drum and the band without any appreciable expansion or stretching of the band. While one end of this band is anchored by a loop 9 to a clip 10, the return-bight of the end of the band 8 is overlaid by the adjacent end of another shorter section of band 11, which is elastic material permitting a certain degree of stretch, while the other end of this suitably elastic section 11 is clamped by clamp 12 to the opposite end 8ª of the inextensible band or strap 8. The anchor clip 10 is riveted or bolted to a rigid cross member 13 of the chassis frame, which in the form shown is an angle-iron providing a rigid support with respect to the sills of the frame, so that it resists all strains incident to the shock-absorbing or dampening actions involved in the engagement of the band 8 with the drum 6 involving the torque on the stabilizing cross-bar 1.

While the clamping of the elastic sections of the drum band to the inelastic major portion of the band may be made in various ways, an effective construction used by me is shown in Fig. III, having plates 14, 14ª. Each end of 14 having a right angle turn machined down to a bolt, adapted to each engage the end of the lower plate 14ª, while in the middle a bolt 16 provides for tightly clamping the plates together and thereby the intermediate bites of the elastic and inelastic sections of the band. Each plate has a plurality of prongs 17 stamped so as to project on the inner faces of both plates and engage the material of the bands and prevent slipping.

It will thus be seen that the construction provides a cross-car bar 1 adapted to transmit torque from side-to-side of the car as forces impressed upon it by the lever arms 3, 3ª, and they transmit any force or displacement due to a wheel displacement or shock on one side, through the torque-bar to the lever on the opposite side, and therefore transmit the force and the displacement to the wheel-borne member on that other side, and thereby effect a displacement of the unsprung mass on that side with respect to the rigid frame. When the spring suspension has incurred a compression due to force on one side resulting from a tendency of the body to careen due to centrifugal force, or due to a shock by one wheel encountering an obstacle, the torque-bar oscillates and turns the torque arm on the opposite side, and the drum is oscillated to the same angular extent but moving in the direction due to the relative compression of a spring on any side the band 8 offers little resistance because of the elastic section 11 connecting one end of the band 8 to the fixed anchorage 10. However, as the torque-bar 1 begins to oscillate in the return direction to normal condition of spring suspension, the elastic section of the band pulls the snubbing or shock-dampening belt 8 into clinging contact with the face of the drum 6, and consequently retards or dampens the recoil motion of the torque-bar 1, and through its arms and links it dampens the return motion of the spring on either side, and thereby prevents continued vibration of the car springs equally on both sides.

It will be understood that variations of the shock absorbing unit may be made, such as providing elastic tension either by the rubber section of the belt or by a suitable spring, to cause some resistance to turning of the drum upon the upward movement of the free ends of the lever arms, and thereby effect some resistance to initial shock, but the major and essential resistance to turning of the drum is in the return or recoil, in order to assure the desired dampening effect and prevent any repeated vibration of the car suspension springs after initial shock—or after an initial deflection due to the strains resulting from centrifugal force when rounding curves and when thereafter resuming the driving in a straight course.

While the particular form of my invention herein illustrated has been operated and found by me to function with great advantage, completely effecting ride ease and absence of spring vibration, I have designed to apply to the torque-bar other forms of shock absorbers, suitably anchored to a rigid part of the frame, effective as part of the sprung mass of the vehicle.

The single shock absorber may be operatively connected for the purposes hereinbefore described, at any convenient part of the cross-car stabilizer bar, or otherwise mounted and connected so as to function with the torque-bar for the purposes herein described.

While my stabilizing and shock-absorbing construction is herein shown and described as an equipment on the chassis in connection with the rear or driving axle, and the torque or stabilizing cross-car element is located in front of a rear axle, I may otherwise arrange my stabilizing and return-dampening equipment by suitably adapting the parts for mounting to the rear of the axle, and I have likewise used forms of my stabilizer and shock absorber equipment to effect the advantageous anti-side-rocking and stabilizing with respect to the front wheels of automobiles.

As to the particular invention herein claimed, many variations may be made—but what I claim and desire to secure by Letters Patent is:

1. The combination in a motor vehicle having a sprung mass and an unsprung mass of an equalizing bar on the sprung mass, provided with operative connections near its opposite ends to the unsprung mass, a single shock absorber means connected to the bar between the ends of the bar, and operating connections at substantial equidistance therefrom whereby the torsional strains in the bar are equalized on opposite sides of the shock absorber.

2. The combination in a motor vehicle having a sprung mass and an unsprung mass of a pair of sills rigidly spaced with relation to each other and supporting the sprung mass, a cross frame member, a single shock absorber supported at the middle of the vehicle by the cross frame member, and operative connections from the shock absorber, including a cross car torque-bar pivotally mounted on the frame and means operatively connecting the ends of the bar to each of a pair of wheels adjacent the ends of the bar.

3. In an automobile stabilizing equipment, a torque-bar, cooperating lever arms and links connecting said bar to axle means, a fixed member on each sill of the automobile designed to oscillatably support the ends of the bar and a single shock absorber operatively associated with the bar to dampen the spring reaction between the axle means and sills.

4. In an automobile ride stabilizing equipment, an equalizing torque bar having a length sufficient to extend the distance between the side frame members of a vehicle and adapted to have end bearing therein, means near the ends thereof for connection with the wheels and axle, and a shock absorber element mounted rigidly on the bar between its ends and between said connecting means.

5. In an automobile stabilizing equipment, a torque-bar, cooperating lever arms and links connecting said bar to axle means, a fixed member on each sill of the automobile designed to oscillatively support the ends of the bar and a single shock absorber operatively connected with the bar, said shock absorber being so constructed and arranged as to lightly dampen spring compression and heavily dampen spring reaction.

CHARLES B. HUNTMAN.